INVENTOR.
MALCOLM D. WIDENOR
BY James A. Eisenman
ATTORNEY

Oct. 11, 1966  M. D. WIDENOR  3,278,847
SELF-CALIBRATABLE PHASE SENSITIVE MEASURING APPARATUS
Filed Nov. 30, 1962  2 Sheets-Sheet 2
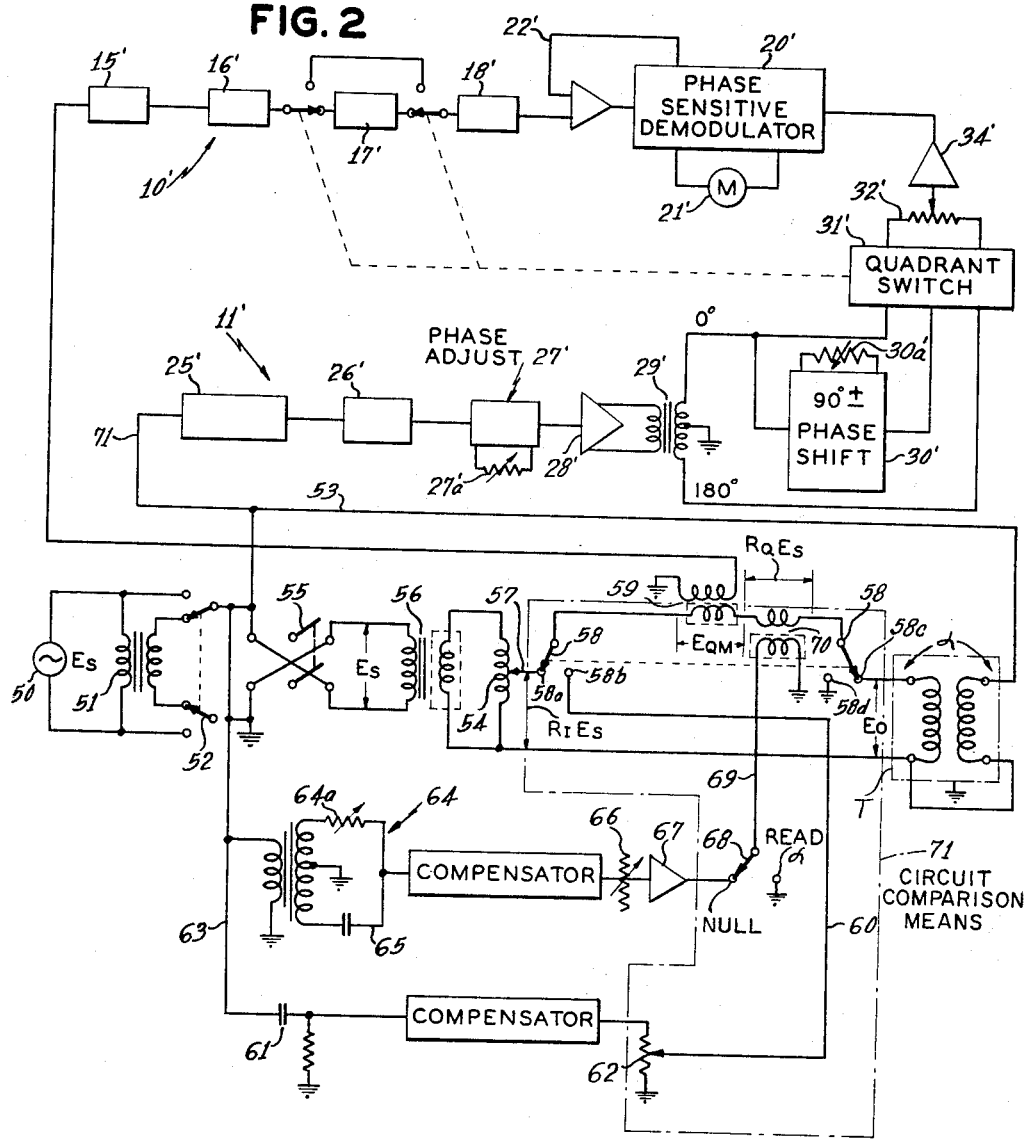
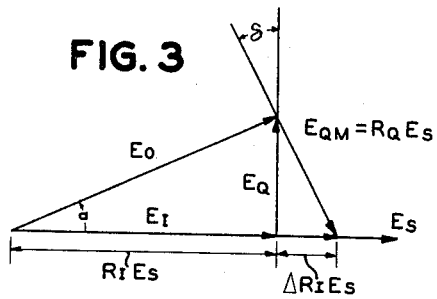
*INVENTOR.*
MALCOLM D. WIDENOR
BY
*James A. Eisenman*
ATTORNEY

# United States Patent Office 3,278,847
Patented Oct. 11, 1966

3,278,847
SELF-CALIBRATABLE PHASE SENSITIVE
MEASURING APPARATUS
Malcolm D. Widenor, Seacliff, N.Y., assignor to North Atlantic Industries, Inc., Westbury, N.Y., a corporation of New York
Filed Nov. 30, 1962, Ser. No. 241,426
14 Claims. (Cl. 324—83)

This invention relates to phase sensitive measuring apparatus and more particularly to instruments for measuring the phase angle of a signal with respect to a reference, for measuring the in-phase and quadrature components of the signal, and for determining the components of complex voltage ratios.

Instruments of the type contemplated by the present invention include phase angle voltmeters, ratiometers and the like which can be employed for example as phase sensitive null detectors, for zeroing high precision synchros, for phase alignment of magnetic amplifier systems and the measurement of torque and non-torque-producing signals in such systems, for phasing of two-phase servomotors and chopper amplifiers, for trimming and zeroing of transducers and sensors, for precise determination of the complex transformation ratio of transformers, resolvers, amplifiers, and A.C. transducers, and for the alignment of carrier amplifiers and notch networks.

Comparable instruments employed heretofore have been efficient in reliability, versatility and convenience. Frequently, it has been necessary to employ several different instruments to perform the functions of the present invention, and in order to obtain measurements over a wide band of frequencies, it has been necessary to resort to uneconomical and impractical schemes, such as those requiring external calibration equipment.

It is accordingly a principal object of the present invention to provide an improved phase sensitive measuring instrument which overcomes or greatly alleviates the deficiencies of prior comparable devices.

More specifically, it is a principal object of the invention to provide an instrument capable of measuring the phase angle of a signal with respect to a reference, and the in-phase and quadrature components of the signal, as well as the R.M.S. value of the total signal, all with improved accuracy, reliability, and facility.

Another object of the invention is to provide a device of the foregoing type which requires no external calibration equipment.

A further object of the invention is to provide a device of the foregoing type which eliminates the effects of harmonics or "cross-over" errors.

Yet another object of the invention is to provide a device of the foregoing type which is operable over a wide band of frequencies.

The broad principles of the invention are exemplified by an embodiment which includes an input signal channel and a reference signal channel, the outputs of which are applied to a phase-sensitive detector. Through the provision of precision broad-band phase shifters, additional phase shifters, and a suitable switching arrangement, it is possible to line-up and calibrate the device of the invention without the use of external calibration equipment, and thereafter to obtain accurate measurements or comparisons of the type previously described over a wide band of frequencies.

The foregoing objects, features, and alvantages of the invention, and the manner in which the same are accomplished will become more readily apparent upon consideration of the following detailed description of the invention taken in conjunction with the accompanying drawings, which illustrate preferred an exemplary embodiments of the invention, and wherein:

FIGURE 2 is a schematic diagram of another embodiment of the invention;

FIGURE 3 is a vector diagram, with symbols, illustrating the source of error in in-phase measurement known as the orthogonality error.

Figure 1:
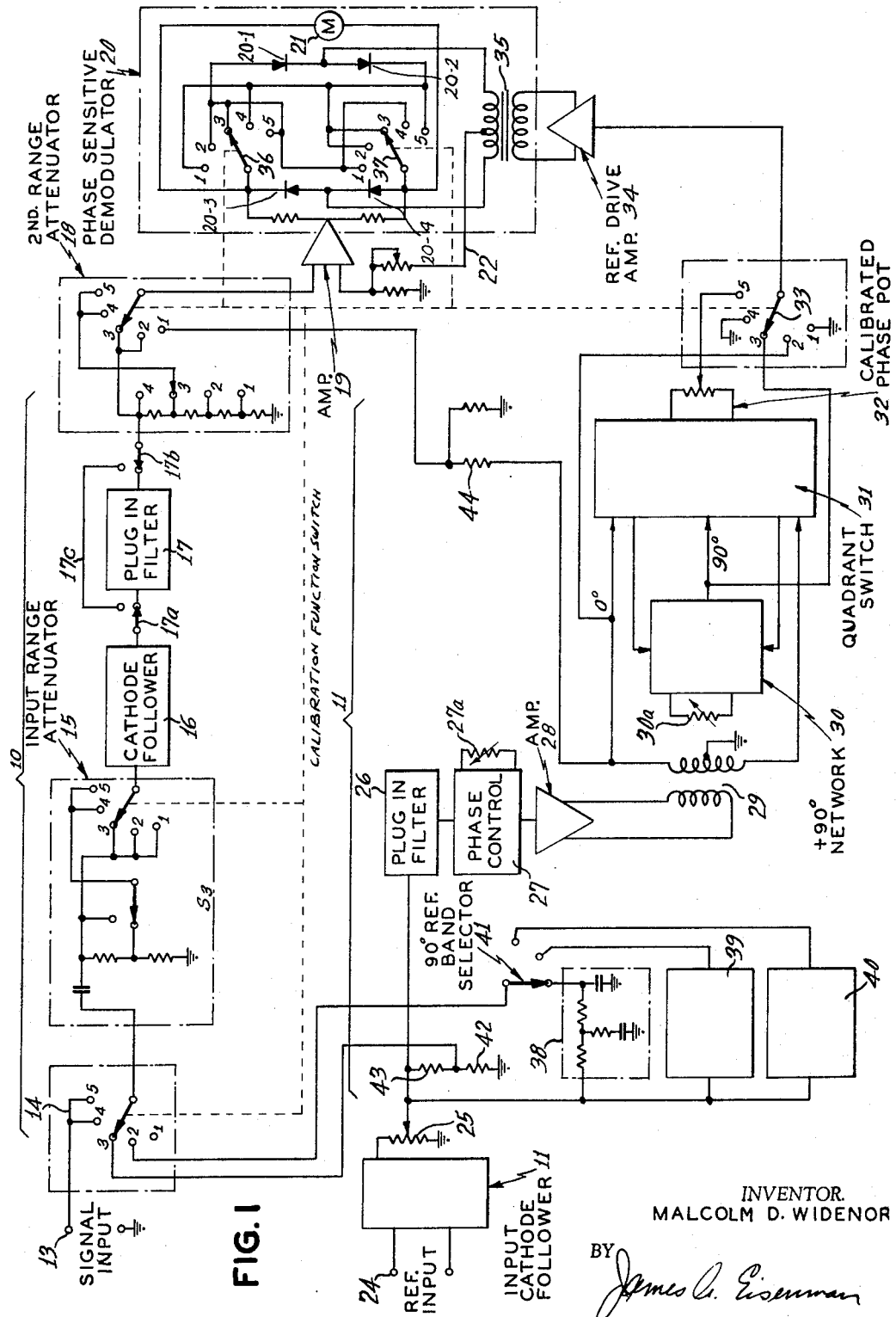
FIGURE 1 is a block diagram of a preferred embodiment of the invention.

Referring to the drawings, and initially to FIGURE 1 thereof, reference numeral 10 designates the input signal channel and reference numeral 11 the reference signal channel. The signal channel 10 extends from a signal input terminal 13 through a five-position line-up and control switch 14, an input range attenuator and switch 15, a cathode follower 16, a plug-in type filter 17, and a second range attenuator and switch 18, to an amplifier 19. The purpose of the line-up switch 14 will become more apparent hereinafter. Amplifier 19 feeds a phase-sensitive detector or ring type demodulator 20, which has a meter 21. A feedback path 22 is provided from the detector to the amplifier 19. Details of this detector circuit and the feedback path around the amplifier 19 are described in the co-pending application Ser. No. 334,847, filed Dec. 31, 1963. The input range attenuator and switch 15 and second range attenuator and switch 18 are arranged to provide a suitable signal level at the input of the amplifier 19. The cathode follower 16 is employed for impedance matching and isolation purposes. Filter 17 is used to eliminate harmonics of the signal, which could produce erroneous readings. The filter may be switched out of the signal channel by use of switch elements 17a and 17b and jumper 17c, when the signal is sufficiently free of harmonics.

The reference channel 11 includes an input terminal 24 of the reference channel and passes through a level control and cathode follower 25, a plug-in filter 26 and an adjustable phase control 27, to an amplifier 28. The level control serves substantially the same purpose as the input attenuator and range switch of the signal channel, and functions of the cathode follower and filter are the same as the corresponding components of the signal channel. The reference channel filter may also be bypassed, if desired for certain purposes to be described below. The phase control 27 is made adjustable, as indicated by a variable resistor 27a. Its purpose is to adjust the phase of the reference channel to match it to that of the signal channel, and thereby to eliminate errors which might be introduced by variations in phase shift with respect to frequency of voltages applied to the respective channels.

The amplifier 28 has its output applied to the primary of a transformer 29, the secondary winding of which has a grounded center tap. The voltages available at the ends of the secondary winding are respectively in-phase (0°) and 180° out of phase with the reference voltage applied to the input terminal 24. A 90° phase shift networks 30 having an adjustment control resistor 30a is connected to a quadrant switch 31 by means of which there is available reference voltages with zero degrees, plus 90°, minus 90°, and 180° phase with respect to the reference input. The quadrant switch 31 is connected to a calibrated phase adjustment potentiometer 32 which, together with the 90° phase shifting network 30 and the 0° terminal of the secondary of the transformer 29, is connected to a function selector switch 33 in a manner to be described. Terminals 1 and 4 are grounded, terminal 2 is connected to the 0° terminal of the transformer, terminal 3 is connected to the 90° phase shifting network 30 at a 90° to 270° terminal thereof and terminal 5 is connected to the calibrated phase potentiometer 32.

The common terminal of the selector switch 33 is connected to a reference drive amplifier 34, the output of which is coupled by a transformer 35 to the phase sensitive demodulator 20. It will be observed that this output and the output of the amplifier 19 of the signal channel are coupled to the demodulator 20. The demodulator 20 comprises four diodes 20–1, 20–2, 20–3 and 20–4 with the meter 21 connected between the junction of diodes 20–1 and 20–3 and the junction of diodes 20–2 and 20–4. Five terminal switches 36 and 37, preferably ganged to the function selector switches 14 and 33, are employed to permit portions of the demodulator 32 to be employed as a simple full-wave rectifier circuit for measurements in which phase angle is not desired. In positions 1 and 4 of these switches the diodes 20–3 and 20–4 are disassociated from the remainder of the phase-sensitive demodulator circuit. In positions 2, 3 and 5 the demodulator circuit is complete.

The reference channel 11 has a plurality of precision broadband 90° phase reference or shifting networks 38, 39 and 40, preferably taking the form described in the copending applications Ser. Nos. 176,341 and 210,055, filed Feb. 28, 1962, and July 16, 1962, respectively. These networks are designed to produce a precise 90° phase shift over a decade of operating frequencies, successive networks handling successive decades of frequencies as indicated, with the full band extending from 10 cycles to 100 kc. The precision references receive their inputs from the reference level adjustor 25, and the outputs of the networks are connected to contacts of a reference band selector switch 41. The common contact or armature of this switch provides a precise 90° reference phase for application to the function selector or line-up switch 14 as shown. A precision 0° phase reference 42, which can include a precision resistance divider 43, is also connected to the output of the reference level adjustor 25 and to the function selector switch 14.

It will be observed that the function switches 14, 33, 36 and 37, as well as the switches in the switches of the range attenuators 15 and 18 each have five terminals. Each corresponds to a function now to be described. In this connection it will be seen that terminal 1 of the second range attenuator switch 18 is connected to the 0° terminal of the transformer 29 of the reference channel 11 through a reference level adjusting network 25. As previously indicated, if preferred, all six of the five terminal switches can be ganged together as shown in the drawing.

To use the instrument of FIGURE 1, a suitable A.C. reference voltage is connected to the reference input terminals 24, and the function selection is accomplished by placing switches 14, 15, 18, 33, 36 and 37 on terminal or contact 1, which may be called "Reference Level Set." In this position the signal passes through the reference channel through the transformer 29 and across the reference level adjustment circuit 25 into the signal channel. Switches 36 and 37 of the detector 20 are positioned to cause the detector to operate as a simple rectifier circuit, so that the level of the reference potential may be monitored, and adjusted through the use of the level control 25.

In the second position of the function selector switches, a 90° precision phase reference potential is applied to the input of the signal channel from one of the precision networks 38, 39 or 40, the particular network being chosen by the switch 41 in accordance with the desired operating frequency range. At the same time a 0° reference phase potential is connected to the phase-sensitive detector by the amplifier 34. In the second function selector demodulator or detector 20 operates in its phase-sensitive mode. The phase control 27 is now adjusted via resistor 27a until a null is obtained on the meter 21. The effect of this adjustment is to align the signal and reference channels so that they are exactly in phase.

The function selector is next placed in the third position. In this position a 0° phase reference from the precision 0° network 42 is inserted at the input of the signal channel, and a 90° phase reference is applied to the detector 20 by shifter network 30 and amplifier 34. The detector again is operating in its phase-sensitive mode. The fine phase control comprising variable resistor 30a of the network 30 is now adjusted until a null is again obtained on the meter 21. The effect of this adjustment is to transfer to the 90° phase shifting network 30 a precision comparable to the precision of the broadband reference networks 38, 39 and 40.

If the function selector is now placed in its fourth position, the instrument may be employed to read the total R.M.S. or fundamental value of a signal applied to signal input terminals 13. In this position of the function selector the detector circuit 20 again operates as a simple rectifier, and the input of the reference channel amplifier 34 is grounded at switch 33. In the fifth position the instrument is set up in a measuring mode, similarly to the fourth position, except the aligned channels are used to measure as a phase-sensitive system, by virtue of the connections in the phase-sensitive demodulator 20, and the reference signal channel 11 incorporates the calibrated phase potentiometer 32.

Referring now to FIGURE 2 the invention is illustrated as embodied in a phase sensitive measuring apparatus in which the measurement can take the form of a comparison measurement rather than a direct measurement as is characteristic of the embodiment of FIGURE 1. For purposes of illustration the comparison measurement instrument of FIGURE 2 takes the form of a complex voltage ratiometer which can be used to determine the components of a complex voltage ratio. In the illustrated embodiment a test item T in the form of a transformer is connected in a measuring circuit which includes a suitable A.C. voltage source 50 connected through a line isolation transformer 51, which can be eliminated from the circuit by means of a selector switch 52, to the primary winding of the test item transformer T via a conductor 53 and a common ground connection. The reference voltage source is also connected to a precision inductive ratio divider or ratio box 54 through suitable circuitry including a polarity reversing switch 55 and a precision inversion transformer 56, the secondary winding of which, together with one terminal of the precision ratio divider are connected to a common ground with the test item.

The variable output of the precision ratio divider appearing at the terminal 57 is connected to the ungrounded terminal of the secondary winding of the test item T through a circuit including both sections of a two section selector switch 58 and an impedance element taking the form of the primary winding of a bridge-null transformer 59, the secondary winding of which is coupled to the signal channel 10′ corresponding to the channel 10 of the instrument of FIGURE 1 and like components of which are identified by like, primed referenced numerals. Thus it will be seen that the output voltages of the precision ratio divider 54 and the secondary winding of the test item T are connected in opposition.

The first section of the two section selector switch 58 includes a contact 58a for setting the system in measuring mode and a contact 58b which is connected by a conductor 60 to a precision 90° phase shifting reference, preferably comprised of passive elements and which can be designed in accordance with the disclosure of the pending application Ser. No. 176,341 filed Feb. 28, 1962. The output of the precision 90° phase reference 61 includes a level-adjusting potentiometer 62. The input is connected by means of a conductor 63 to the reference voltage source 50. Also connected to the reference voltage source 50 via the conductor 63 is a calibrated quadrature signal injection channel indicated generally by the numeral 64 and includes a precision 90° phase reference or shifter 65, preferably of the type disclosed in the pending application 210,055 filed July 16, 1962, a quadrature voltage level potentiometer adjuster 66, an amplifier 67 and a two-terminal selector switch 68. The output of the channel 64 is introduced by a conductor 69 into the measuring circuit or network including the precision ratio divider 54 and the test item T. In the illustrated arrangement, this is accomplished by means of an injection transformer 70, the secondary winding, representing an impedance element, of which is connected in series with the primary winding of the bridge-null transformer 59 which introduces the signal to be measured and analyzed into the signal channel 10'.

The circuit coupling the precision ratio divider and the test item is completed by the second section of the selector switch 58 which includes a contact 58c connected to the ungrounded side of the secondary winding of the test item T and a contact 58d which is connected to ground. With the switch 58 connected with its contacts 58a and 58c engaged by the wiper blade of the respective sections of the switch, the instrument is set up in its measuring mode and with the connections on the contacts 58b and 58d the instrument is connected in its calibrating mode as will be described more fully below.

The signal channel 10' includes an input range attenuator 15', a cathode follower 16', a plug-in type filter 17', a second range attenuator or switch 18' ganged to the input range attenuator 15' and an amplifier 19' connected to a phase sensitive demodulator 20' the output of which is connected to a meter 21'. A feedback circuit 22' is connected from the demodulator to the input of the amplifier 19' and the demodulator circuit includes internal switch means to convert its operation to full wave rectifier mode, all as described above in connection with FIGURE 1.

The reference voltage source 50 is also connected, via the line isolation transformer 51, the conductor 53, and a conductor 71, to a reference channel 11' including a reference level adjustor and input cathode follower circuit 25' a filter 26' a phase control circuit 27' including an adjusting potentiometer 27a' an amplifier 28' coupled by a transformer 29' to a 90° phase shifting network 30', a quadrant switch 31', a phase shifting potentiometer 32', and an amplifier 34' connected to the phase sensitive demodulator 20'. It will be recalled that the quadrant switch 31' includes a multiple contact switch arrangement whereby the 90° phase shifting networks 30' can be bypassed so that a 0° phase shift signal is passed through the reference channel into the demodulator 20'. The switch 58, the primary winding of the bridge-null transformer 59, the primary winding of the transformer 70, the switch 68 and the potentiometer 62 collectively represent circuit-comparison means 71, which present the sum of the signals from the phase adjustor and the precision phase reference to the phase detector in nulling relationship.

In operation, with the voltage from the source 50 impressed on the system, the function switch 58 is first switched to its calibrating position connecting the output of the 90° phase reference standards 61 in a circuit opposing the output of the quadrature injection channel 64, the switch 68 having been closed to complete the circuit. The polarity of the output of the quadrature injection channel and the precision 90° reference are arranged to permit these two signals to be nulled against each other by adjusting variable resistor 64a with the voltmeter in the in-phase mode and variable level control 66 with the voltmeter in the quadrature mode. This action serves to align or calibrate the quadrature injection channel to a precision comparable to that of the 90° reference 61.

Next the selector switch 58 is thrown to complete the measuring circuit. This action opens the circuit to the precision phase reference 61 and the calibration which has been imported to the phase reference 65 of the quadrature channel is used to align the signal and reference channels 10' and 11' together with the impedance elements of the measuring circuit, the alignment procedure being carried out as described above in connection with FIGURE 1. The output of the test item T is then summed with the output of the precision ratio divider and the injected quadrature voltage from the quadrature channel 64, the summation being accomplished by the precision bridge-null transformer. The resulting voltage is displayed on the meter 21', with the switches in the reference channel 11' thereof being set in the phase sensitive measuring mode reading either the quadrature of in-phase imbalanced voltages. The readings are taken after suitable adjustment of the ratio divider and the quadrature channel signal level. With the instrument properly set, the meter will indicate the null transfer angle, which is the amount the output voltage of the ratio divider is shifted in phase by the measuring circuit impedances in reaching the input terminals of the detector 20'.

The injected quadrature signal serves to cancel out the quadrature component in the output of the test item I.

It will be understood that the scaling of voltmeter sensitivity is such that a direct meter reading of phase angle may be obtained in either degrees or radians. The scaling causes the meter to read the ratio of quadrature voltage to the in-phase voltage. Actually, referring to the vector diagram of FIGURE 3, the meter indicates the ratio of quadrature voltage $E_Q$ to in-phase voltage $E_I$, but for phase shifts less than 5 deg.

$$\alpha = \tan \alpha = E_Q/E_I$$

The meter then reads $\alpha$ directly.

The quadrature signal is provided by the passive network 65 and the passive 90-deg. reference standard 61 is used as an absolute calibration check of the ratiometer's orthogonality or integrity of quadrature injection.

An orthogonality error is produced when the injected quadrature signal is off 90 deg. by a small angle $\delta$. The error is proportional to the phase shift measured.

$$\text{orthogonality error} = (\tan \delta)(\tan \alpha) \times 100$$
$$= \delta \tan \alpha \times 100 \text{ (percent)}$$

The calibrating procedure described, wherein the quadrature signal is established at precisely 90° in phase relation to the reference signal, avoids significant errors in measurement, such for example as the orthogonality error which for many measurements can exceed any inherent errors deriving from the precision ratio divider in the measuring circuit.

While the invention has been described above having reference to specific embodiments thereof it will be understood that it can take various forms and arrangements within the scope of the invention. For example, this comparison circuit impedance element can take the form of summing resistors in place of the illustrated transformer windings in the arrangement of FIGURE 2. Also, whereas the precision phase reference 42 is shown as 0° reference, it will be understood that this is equivalent to a 180° phase reference. Similarly the 90° references can be regarded for most purposes as equivalent to —90° or 270° references. The invention should not, therefore, be regarded as limited except as defined by the following claims.

I claim:

1. Self-calibratable phase sensitive measuring apparatus comprising means defining an input signal channel, means defining a reference signal channel, each channel having input and output connections, phase sensitive detector means electrically coupled to the outputs of the channels to provide an electrical output in accordance with a phase relationship of the signals in the reference and input signal channels and providing a null output when the signals bear a specific phase relationship to one another, a pair of precision phase reference networks affording two predetermined, different discrete phase shifts for a given signal passed there-through, said input connections introducing a reference input signal into the reference channel, means to connect the reference input signal to the phase reference networks and means to connect the outputs of either of the two phase reference networks to the input end of the input signal channel, at least two phase adjusting means, means to connect the two phase adjusting means in at least one channel to shift the phase of the signal in one channel relative to the signal in the other channel, means to selectively bypass one of said phase adjusting means, whereby with one of the precision phase reference networks connected to the input signal channel the signal in one of the two channels can be adjusted by one phase adjusting means to produce a null output from said detector, and whereby with the second precision phase reference networks connected to the input signal channel the signal in one of the two channels can be adjusted by the second phase adjusting means while the first phase adjusting means is connected in the circuit and imparting its phase adjustment thereto, thereby aligning the two channels in nulling phase relationship which includes the phase shift imparted by the two precision phase reference networks, with the input signal channel receiving a signal to be measured and the precision phase networks removed from the circuit.

2. Apparatus as set forth in claim 1, including an additional phase shifting network connected in one of said channels operating in conjunction with one of said phase-shifting means to afford a 90° phase relationship between the signals in the two channels, one of said precision phase reference networks affording 0° phase shift and the other affording a 90° phase shift, whereby a zero degree phase reference and a 90° phase reference may be inserted selectively and sequentially in said signal channel and said adjusting means may be actuated to obtain a null output from the detector means.

3. Apparatus as set forth in claim 1, one of said phase adjusting means being electrically connected to add or subtract phase shift in said reference channel, and selector switch means to selectively bypass said one phase adjusting means when the precision phase reference network is connected to feed a phase-shifted reference channel signal as an input to the input signal channel.

4. Apparatus as set forth in claim 1, said precision phase reference networks including a precision 90° phase shifting portion and a precision zero degree phase shifting portion, and means to feed a phase shifted reference channel signal as an input to the input signal channel to obtain null outputs from the detector means.

5. Self-calibratable phase sensitive measuring apparatus comprising means defining an input signal channel, means defining a reference signal channel, phase sensitive detector means electrically coupled to the outputs of said channels for affording an output representative of a phase relationship between the signals in the input signal and reference signal channels, a precision phase reference network including at least one phase shifter portion with precise 90° phase shift characteristics and a zero degree phase shifter portion, switch means for selectively connecting the precise 90° phase shifter to introduce a precisely phase-shifted reference signal as an input to the input signal channel, said reference signal channel having a phase control means for matching the phase shift of said reference signal channel to the phase shift of said input signal channel over any of a plurality of frequency bands, and an adjustable 90° phase shifter having switch means for inserting it in said reference signal channel at will, the last-mentioned phase shifter being adjustable to produce a 90° phase shift, whereby a zero degree phase reference may be inserted in said input signal channel and said phase control means adjusted to obtain a null from said phase detector means, and then a 90° phase reference in said one band may be inserted in said input signal channel and said adjustable 90° phase shifter inserted in said reference signal channel and adjusted to obtain a null from said phase detector means, thereby to transfer to said adjustable 90° phase shifter the precision of said precision phase shifter.

6. Apparatus as set forth in claim 5, further comprising filter means in said input signal and reference signal channels for passing the same frequency, said filter means having identical phase characteristics.

7. Apparatus as set forth in claim 6, including first switch means to connect a reference signal through said signal channel and to open said reference signal channel and second switch means in said detector means to rearrange the polarities therein to convert said detector means to rectifier means to afford average values of the rectified signal voltage.

8. Apparatus as set forth in claim 5 including quadrature switching means electrically coupled to said adjustable 90° phase shifter.

9. Apparatus as set forth in claim 5, said precision phase shifters and said adjustable phase shifter being composed of passive elements.

10. Self-calibratable quadrature and in-phase ratio measuring apparatus comprising means defining an input signal channel, means defining a reference signal channel and a detector means electrically coupled to the outputs of the channels to afford a null output representative of a phase and amplitude relationship between the signals in the reference signal and input signal channels, a precision phase reference network affording a 90° phase shift for a given signal passed therethrough, a phase adjustment means, means to introduce a reference input signal into the reference signal channel, into the precision phase reference network and into the phase adjustment means, circuit comparison means connected to the input signal channel, switch means to present the sum of the signals from the phase adjustment means and the precision phase reference to the combining means in nulling relationship, said phase adjustment means affording a shift in the phase-amplitude relationship of the input signal and reference signal channel as seen by the detector means to a null condition, and means to electrically remove the precision phase reference network from the circuit to the detector means with the measuring apparatus in nulling phase relationship but including the phase shift imparted by the precision phase reference network, and means to connect a test signal into the input signal channel.

11. Apparatus as set forth in claim 10, including a quadrature circuit including in series therewith a 90° phase shifter having input and output terminals, signal injection means to inject the quadrature circuit output signal into the input signal channel, and switch means (selectively) to connect the quadrature circuit to the signal injection means.

12. Apparatus as set forth in claim 11, first adjusting means in said quadrature circuit, said reference signal channel including in series therewith an adjustable 90° phase shifter, circuit means to selectively connect said quadrature circuit, including its 90° phase shifter, and said precision 90° phase reference network to said input signal circuit, the precision 90° phase shifter and the quadrature 90° phase shifter affording output signals 180° out of phase, whereby the quadrature circuit can be nulled by said detector means against said precision reference.

13. Apparatus as set forth in claim 12, said quadrature circuit including signal level adjusting means.

14. Apparatus as set forth in claim 12, said means to connect the test signal to said input signal channel including a bridge-null transformer, the primary winding of which comprises a comparison circuit impedance element adapted to be selectively connected in series with both said quadrature circuit and precision 90° phase reference network.

References Cited by the Examiner

UNITED STATES PATENTS

| | | | |
|---|---|---|---|
| 2,749,516 | 6/1956 | Ragazzini et al. | 324—88 |
| 2,857,568 | 10/1958 | Hering et al. | 324—83 |
| 2,903,642 | 9/1959 | Seigel | 324—83 |
| 3,101,448 | 8/1963 | Costas | 328—133 |

WALTER L. CARLSON, *Primary Examiner.*

P. F. WILLIE, *Assistant Examiner.*